United States Patent
Asakawa

(10) Patent No.: US 7,151,585 B2
(45) Date of Patent: Dec. 19, 2006

(54) LIQUID CRYSTAL DISPLAY PANEL WITH CORNER PATTERN OF THE SEALANT HAVING A PORTION SUBSTANTIALLY WIDER THAN ANOTHER PATTERN CONNECTED TO THE CORNER PATTERN

(75) Inventor: Takenobu Asakawa, Nomi-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 38 days.

(21) Appl. No.: 10/491,728

(22) PCT Filed: Oct. 1, 2002

(86) PCT No.: PCT/JP02/10223

§ 371 (c)(1),
(2), (4) Date: Apr. 5, 2004

(87) PCT Pub. No.: WO03/032064

PCT Pub. Date: Apr. 17, 2003

(65) Prior Publication Data

US 2004/0239864 A1    Dec. 2, 2004

(30) Foreign Application Priority Data

Oct. 3, 2001  (JP) .............................. 2001-307742

(51) Int. Cl.
*G02F 1/1339*  (2006.01)
(52) U.S. Cl. ..................... 349/153; 349/154; 349/190
(58) Field of Classification Search ................ 349/153, 349/190, 154
See application file for complete search history.

(56) References Cited

U.S. PATENT DOCUMENTS

| | | | | |
|---|---|---|---|---|
| 3,871,746 A | * | 3/1975 | Muto et al. .................. | 349/154 |
| 3,926,502 A | * | 12/1975 | Tanaka et al. .............. | 349/154 |
| 3,960,534 A | * | 6/1976 | Oates ........................... | 65/43 |
| 5,548,428 A | * | 8/1996 | Masaki et al. .............. | 349/189 |
| 5,929,959 A | * | 7/1999 | Iida et al. .................... | 349/154 |
| 5,933,209 A | * | 8/1999 | Yonemoto .................... | 349/153 |
| 5,936,695 A | * | 8/1999 | Hida et al. .................. | 349/153 |
| 6,317,186 B1 | * | 11/2001 | Miwa et al. ................. | 349/153 |
| 2002/0196393 A1 | * | 12/2002 | Tashiro et al. ............. | 349/106 |
| 2005/0088604 A1 | * | 4/2005 | Chung et al. ............... | 349/153 |

FOREIGN PATENT DOCUMENTS

| | | |
|---|---|---|
| JP | 04-93824 | 8/1992 |
| JP | 05-15818 | 1/1993 |
| JP | 08-184839 | 7/1996 |
| JP | 08-313917 | 11/1996 |
| JP | 2000-193989 | 7/2000 |
| JP | P2000-193989 | 7/2000 |
| JP | P2002-258253 | 9/2002 |

* cited by examiner

*Primary Examiner*—Huyen Ngo
*Assistant Examiner*—(Nancy) Thanh-Nhan P Nguyen
(74) *Attorney, Agent, or Firm*—McDermott Will & Emery LLP

(57) ABSTRACT

A liquid crystal display panel of the present invention is as follows. For example, in a liquid crystal display panel (L) in which an active matrix substrate (1) and an opposing substrate (2) are bonded with each other by a liquid crystal-sealing seal pattern (7) interposed therebetween and the liquid crystal-sealing seal pattern (7) is arranged so as to surround a liquid crystal layer-region (9), the pattern width (W2) of corner patterns (18b) to (21b) and (22b) to (23b) is substantially wider than the pattern width (W) of transversal patterns (11) to (14) and longitudinal patterns (15) to (17).

6 Claims, 7 Drawing Sheets

LIQUID CRYSTAL DISPLAY PANEL WITH CORNER PATTERN OF THE SEALANT HAVING A PORTION SUBSTANTIALLY WIDER THAN ANOTHER PATTERN CONNECTED TO THE CORNER PATTERN

TECHNICAL FIELD

The present invention relates to a liquid crystal display panel used for a liquid crystal display device.

BACKGROUND ART

In recent years, liquid crystal display devices have been widely used for image display devices that are incorporated in imaging apparatus or the like for information devices such as personal computers or for video devices such as vehicle navigation systems, in order to suppress power consumption and reduce weight and thickness of these imaging apparatus.

A liquid crystal display device is configured to include, for example, a liquid crystal display panel for displaying images by varying light transmissivity in response to input drive signals, a lighting unit that is disposed behind the liquid crystal display device and is for supplying light to the liquid crystal display device, a circuit board for driving the liquid crystal display device, and so forth.

FIG. 6 is a cross-sectional view schematically showing the cross-sectional structure of a conventional active matrix-type liquid crystal display panel.

A liquid crystal display panel L has: an active matrix substrate 1 in which thin film transistors (not shown), a transparent electrode (not shown) composed of a conductive transparent thin film, an alignment layer 3, and so forth are stacked on a surface of a transparent glass substrate 5; an opposing substrate 2 in which a counter electrode (not shown) composed of a conductive transparent thin film, a color filter (not shown) made of three primary color filters of red, green, and blue, an alignment layer 4, and so forth are stacked on a surface of a transparent glass substrate 6; and a liquid crystal-sealing seal pattern 7 arranged so as to bond predetermined opposing regions a, a' and b, b' in the stacking surfaces on the active matrix substrate 1 and the opposing substrate 2. The active matrix substrate 1 and the opposing substrate 2 are spaced apart at a predetermined gap so that their respective stacking surfaces oppose each other, and they are integrated by the liquid crystal-sealing seal pattern 7 interposed therebetween. A space that is surrounded by the active matrix substrate 1, the opposing substrate 2, and the liquid crystal-sealing seal pattern 7 constitutes a liquid crystal layer-region 9. A liquid crystal material is injected into the liquid crystal layer-region 9 to form a liquid crystal layer 10. The liquid crystal layer 10 is formed such that the upper face and the lower face thereof are sealed by the opposing substrate 2 and the active matrix substrate 1, and the side faces of the liquid crystal layer 10 are completely sealed by the liquid crystal-sealing seal pattern 7 and a sealing means, which is not shown in the figure. A central area of the liquid crystal display panel L is provided with a display region 8 composed of a collection of pixels formed in a matrix configuration, and the liquid crystal layer-region 9 is formed so as to include this display region 8.

FIG. 7 is a plan view of the conventional active matrix-type liquid crystal display panel, viewed from its major surface-side. In FIG. 7, the same reference numerals as those in FIG. 6 denote the same or corresponding components. Herein, the two-dimensional shape of the liquid crystal-sealing seal pattern that seals the liquid crystal layer and other sealing means are explained in detail. For convenience in illustration, the arrangement orientation of the liquid crystal-sealing seal pattern was represented as illustrated in the figure.

The liquid crystal-sealing seal pattern 7 arranged in the liquid crystal display panel L is composed of transversal patterns 11–14 and longitudinal patterns 15–17 each extending substantially parallel to and along one side of the outer circumference of the liquid crystal display panel L, spaced apart at predetermined distances, and six corner patterns 18–21 and 22–23 arranged extending diagonally so as to form an angle of about 135° with the transversal patterns and the longitudinal patterns in four corner regions A and in two corner regions B, respectively. These patterns that constitute the liquid crystal-sealing seal pattern 7 are formed so that the pattern widths of the transversal patterns and the transversal patterns and corner patterns are substantially uniform and equal to each other. The transversal patterns, the longitudinal patterns, and the corner patterns that are adjacent to one another are connected to one another in the corner regions A or in the corner regions B, and thus, the liquid crystal-sealing seal pattern 7 is formed. The ends of the transversal pattern 13 and the transversal pattern 14 that are not connected to the corner pattern 22 and the corner pattern 23 extend to the left side faces of the active matrix substrate 1 and the opposing substrate 2, thus forming a liquid crystal injection port 24. Additionally, a liquid crystal sealing agent 25 is provided so as to seal the liquid crystal injection port 24. Accordingly, a specified amount of liquid crystal material completely sealed in the liquid crystal layer-region 9 by the active matrix substrate 1, the opposing substrate 2, the liquid crystal-sealing seal pattern 7, and the liquid crystal sealing agent 25; and the liquid crystal display panel L is thus formed.

The liquid crystal display panel L thus configured is designed to exhibit normal performance in a state in which a specified amount of liquid crystal material is completely sealed in the liquid crystal layer-region 9 by the active matrix substrate 1, the opposing substrate 2, the liquid crystal-sealing seal pattern 7, and the liquid crystal sealing agent 25.

Meanwhile, the above-described liquid crystal-sealing seal pattern 7 is generally formed in the following manner. On the stacking surface of either one of the active matrix substrate 1 or the opposing substrate 2 that is outside of the display region 8, a liquid crystal-sealing seal agent (not shown) having adhesiveness is applied with a screen printing machine so as to have a uniform pattern width. Thereafter, the active matrix substrate 1 and the opposing substrate 2 are bonded together so that their respective stacking surfaces oppose each other, and further, they are heat-pressed by means of high-temperature press in an atmospheric pressure environment; thereby, the liquid crystal-sealing seal agent is cured. With the curing of the liquid crystal-sealing seal agent, the active matrix substrate 1 and the opposing substrate 2 are bonded together at a predetermined gap with the liquid crystal-sealing seal pattern 7 interposed therebetween.

Meanwhile, there may be cases in which the following phenomenon occurs; when applying a liquid crystal-sealing seal agent with a screen printing machine, the amount of the liquid crystal-sealing seal agent applied to the portions that form the six corner patterns of the liquid crystal-sealing seal pattern 7 becomes less, and as a result, the corner patterns 18–21 and 22–23 of liquid crystal-sealing seal pattern 7 become considerably smaller in width than the pattern width of the transversal patterns 11–14 and the longitudinal patterns 15–17. In this case, in order to completely seal the liquid crystal material in the liquid crystal layer-region 9 and to form the liquid crystal layer 10 in a predetermined shape, it is necessary that the corner patterns 18–21 and 22–23 of the liquid crystal-sealing seal pattern 7 have no disconnection, or that they have no passages, such as pinholes, through which the liquid crystal material flows out even if there is no disconnection.

However, the commonly-used liquid crystal-sealing seal agent is an adhesive agent in which an epoxy resin and a phenolic curing agent are dissolved in an organic solvent such as ethyl cellosolve, and accordingly, in the fabrication step in which a liquid crystal-sealing seal agent is heated and cured by high-temperature press to form the liquid crystal-sealing seal pattern, ethyl cellosolve vaporizes due to the heat, forming air bubbles (not shown) inside the liquid crystal-sealing seal agent. These air bubbles are trapped inside the liquid crystal-sealing seal agent that is being cured, and the air bubbles remain inside the liquid crystal-sealing seal pattern 7. These air bubbles have such a characteristic that many of them are formed particularly in the corner patterns 18–21 and 22–23 of the liquid crystal-sealing seal pattern 7. For that reason, in cases where the corner patterns 18–21 and 22–23 of the liquid crystal-sealing seal pattern 7 are considerably smaller in width than the pattern width of the transversal patterns 11–14 and the longitudinal patterns 15–17 and numerous air bubbles are formed inside the corner patterns 18–21 and 22–23 of the liquid crystal-sealing seal pattern 7, the formed air bubbles may come near to each other and aggregate, resulting in disconnection of any of the corner patterns 18–21 and 22–23. In this case, the problem of injection defect arises, which when injecting a liquid crystal material into the liquid crystal layer-region 9, the liquid crystal material leaks from the liquid crystal layer-region 9. Further, even if the disconnection of the corner patterns is not reached, a pinhole piercing through to the outside of the liquid crystal layer-region 9 may be formed when air bubbles formed inside any of the corner patterns 18–21 and 22–23 gather substantially linearly and a plurality of them connect with each other. In this case, the problem of filling defect arises, which the liquid crystal material filled in the liquid crystal layer-region 9 leaks out of the liquid crystal layer-region 9 over time.

DISCLOSURE OF THE INVENTION

The present invention has been accomplished to resolve the foregoing and other problems, and its object is to provide a high-quality liquid crystal display panel in which no filling defect or injection defect occurs by forming the pattern width of the corner patterns of the liquid crystal-sealing seal pattern to be wider than the pattern width of the patterns other than the corner patterns to prevent formation of pinholes inside the corner patterns and disconnection of the corner patterns.

In order to accomplish these objects, the present invention provides a liquid crystal display panel wherein a pair of substrates are bonded with each other at a predetermined gap by a liquid crystal-sealing seal pattern interposed therebetween, the liquid crystal-sealing seal pattern having a corner pattern and being arranged so as to surround a display region when viewed in plan, and a liquid crystal is sealed in a region surrounded by the liquid crystal-sealing seal pattern; and the corner pattern of the liquid crystal-sealing seal pattern has a portion substantially wider than another pattern connected to the corner pattern.

With this configuration, air bubbles formed inside the corner pattern of the liquid crystal-sealing seal pattern can be prevented from aggregating; therefore, it is possible to prevent formation of pinholes inside the corner pattern and disconnection of the corner pattern, and to remedy deficiencies such as filling defects and injection defects with a liquid crystal material.

In this case, the corner pattern of the liquid crystal-sealing seal pattern may be connected with the other pattern so as to form an obtuse angle.

Also in the foregoing case, the corner pattern of the liquid crystal-sealing seal pattern may be formed by a round-shaped pattern.

Further in the foregoing case, the corner pattern of the liquid crystal-sealing seal pattern may be formed by a combination of a round-shaped pattern and a linear-shaped pattern.

With these configurations as well, air bubbles formed inside the corner pattern of the liquid crystal-sealing seal pattern can be prevented from aggregating; therefore, it is possible to prevent formation of pinholes inside the corner pattern and disconnection of the corner pattern, and to remedy deficiencies such as filling defects and injection defects with a liquid crystal material.

The foregoing and other objects, features and advantages of the present invention will become more readily apparent from the following detailed description of preferred embodiments of the invention, with reference to the accompanying drawings.

BRIEF DESCRIPTION OF THE DRAWINGS

FIGS. 1A and 1B are views schematically showing the shape of a liquid crystal-sealing seal pattern according to Embodiment 1 of the present invention, wherein FIG. 1A is a plan view showing the entirety of the liquid crystal-sealing seal pattern arranged in a liquid crystal display panel and FIG. 1B is a plan view showing a corner pattern of the liquid crystal-sealing seal pattern of FIG. 1A enlarged;

FIGS. 2A and 2B are views schematically showing the shape of a liquid crystal-sealing seal pattern according to Embodiment 2 of the present invention, wherein FIG. 2A is a plan view showing the entirety of the liquid crystal-sealing seal pattern arranged in a liquid crystal display panel and FIG. 2B is a plan view showing a corner pattern of the liquid crystal-sealing seal pattern of FIG. 2A enlarged;

FIGS. 3A and 3B are views schematically showing the shape of a liquid crystal-sealing seal pattern according to Embodiment 3 of the present invention, wherein FIG. 3A is a plan view showing the entirety of the liquid crystal-sealing seal pattern arranged in a liquid crystal display panel and FIG. 3B is a plan view showing a corner pattern of the liquid crystal-sealing seal pattern of FIG. 3A enlarged;

FIGS. 4A and 4B are views schematically showing the shape of a liquid crystal-sealing seal pattern according to Embodiment 4 of the present invention, wherein FIG. 4A is a plan view showing the entirety of the liquid crystal-sealing seal pattern arranged in a liquid crystal display panel and FIG. 4B is a plan view showing a corner pattern of the liquid crystal-sealing seal pattern of FIG. 4A enlarged;

FIGS. 5A and 5B are views schematically showing the shape of another liquid crystal-sealing seal pattern according to Embodiment 4 of the present invention, wherein FIG. 5A is a plan view showing the entirety of the liquid crystal-sealing seal pattern arranged in a liquid crystal display panel and FIG. 5B is a plan view showing a corner pattern of the liquid crystal-sealing seal pattern of FIG. 5A enlarged;

BEST MODE FOR CARRYING OUT THE INVENTION

Hereinbelow, preferred embodiments of the present invention are described with reference to the drawings. It should be noted that the liquid crystal display panel according to the present invention has totally the same configuration, insofar as it comprises an active matrix substrate, an opposing substrate, a liquid crystal-sealing seal pattern, a liquid crystal layer, and a liquid crystal sealing agent, as that of the conventional liquid crystal display panel, and its cross-sectional structure is the same also; but there are differences particularly in the shape of the corner patterns among the pattern shapes of the liquid crystal-sealing seal pattern that is arranged in the liquid crystal display panel. For this reason, Embodiments of the present invention hereinbelow will discuss the shapes of the liquid crystal-sealing seal pattern in detail.

Embodiment 1

Embodiment 1 of the present invention shows a first example of the configuration of a liquid crystal display panel that is capable of preventing a liquid crystal material from flowing out by forming the pattern width of corner patterns to be wider than the pattern width of other patterns than the corner patterns.

Figure 1A:
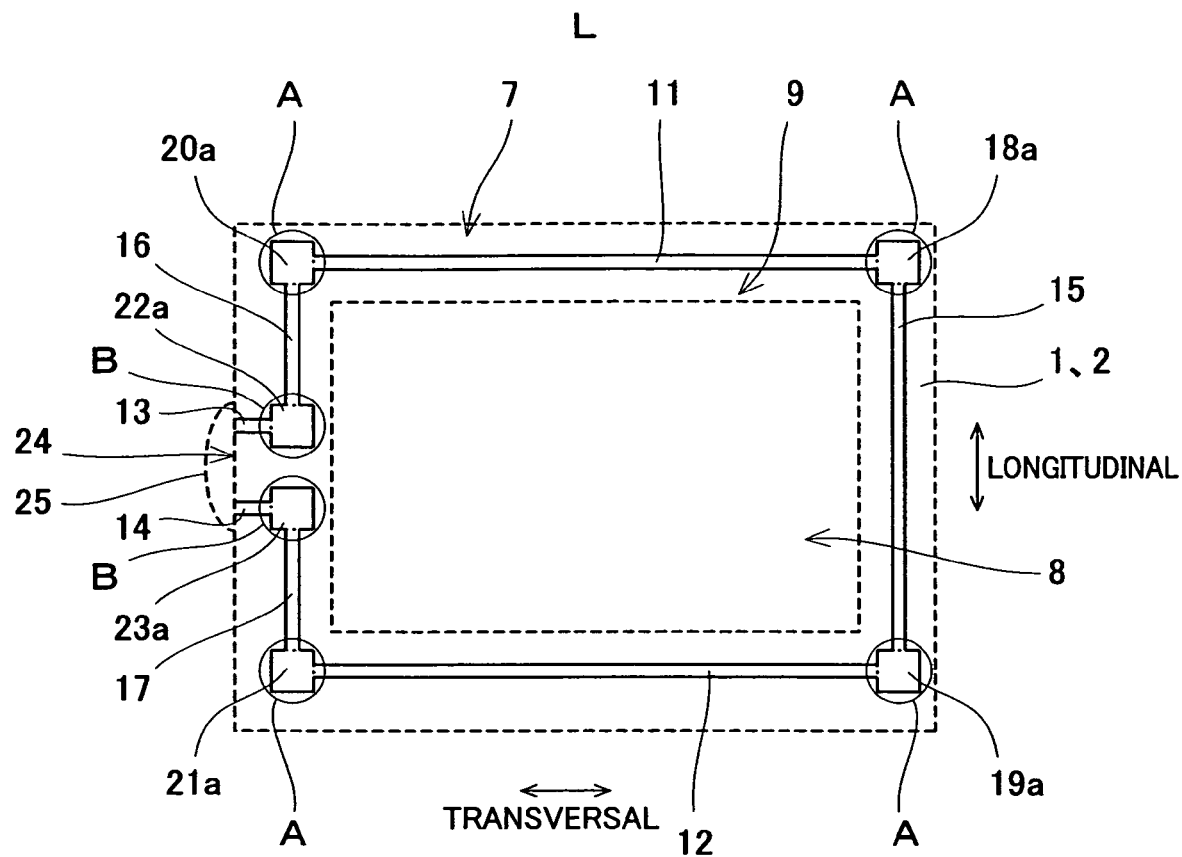
Figure 1B:
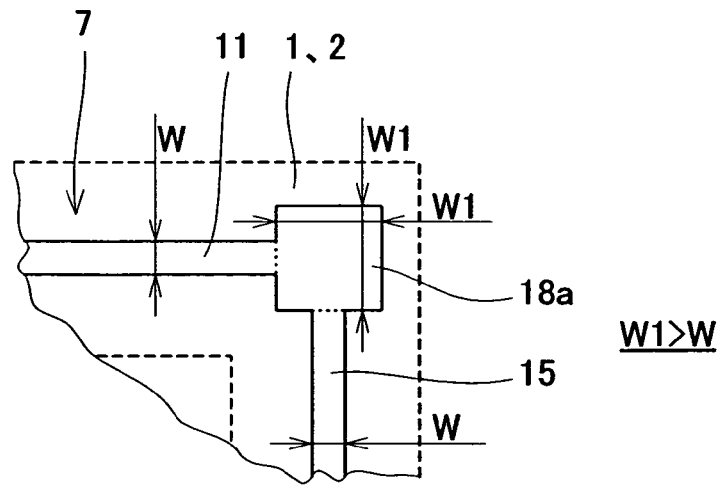
Figure 7:
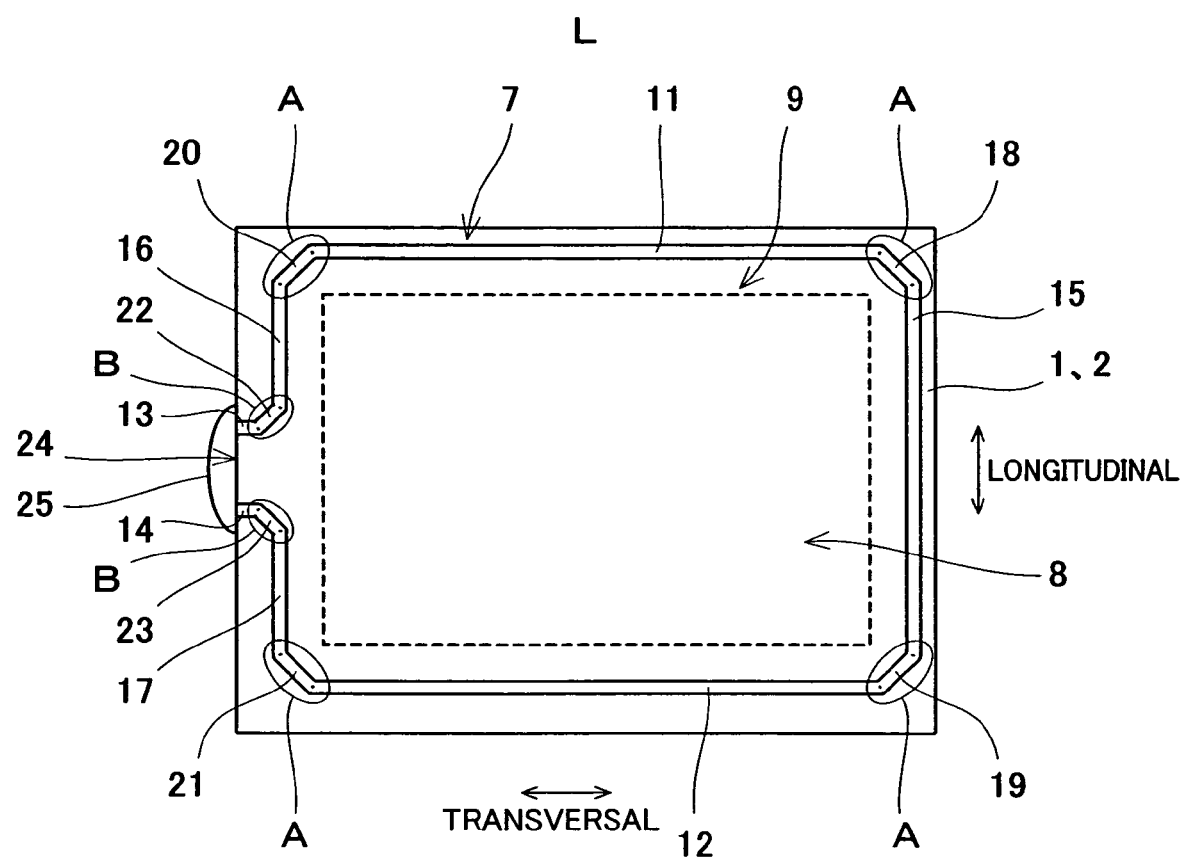
FIG. 7 is a plan view showing a conventional active matrix-type liquid crystal display panel and the shape of a liquid crystal-sealing seal pattern arranged therein.

FIGS. 1A and 1B are views schematically showing the shape of a liquid crystal-sealing seal pattern according to Embodiment 1 of the present invention, wherein FIG. 1A is a plan view showing the entirety of the liquid crystal-sealing seal pattern arranged in a liquid crystal display panel and FIG. 1B is a plan view showing a corner pattern of the liquid crystal-sealing seal pattern of FIG. 1A enlarged. Herein, for convenience in illustration, the orientation of the liquid crystal-sealing seal pattern is represented as shown in the figures. It should be noted that the same reference characters in FIG. 1 denote the same or corresponding parts in FIG. 7.

A liquid crystal-sealing seal pattern 7 arranged in a liquid crystal display panel L comprises transversal patterns 11–14 and longitudinal patterns 15–17 each extending substantially parallel to and along one side of the outer circumference of the liquid crystal display panel L, spaced apart at predetermined distances, and six rectangular-shaped corner patterns 18a–21a and 22a–23a having four sides of substantially equal length arranged parallel to the adjacent two sides of the outer circumference of the liquid crystal display panel L in four corner regions A and in two corner regions B, respectively. The transversal patterns and the longitudinal patterns are mutually connected to the corner patterns in the corner regions A or in the corner regions B, and thereby the liquid crystal-sealing seal pattern 7 is formed. The pattern widths of these patterns that constitute the liquid crystal-sealing seal pattern 7 are formed so that those of the transversal patterns 11–14 and the longitudinal patterns 15–17 are substantially equal to each other, whereas those of the corner patterns 18a–21a and 22a–23a are +10% or more wider than the pattern width of the transversal patterns and the longitudinal patterns connected thereto. The ends of the transversal pattern 13 and the transversal pattern 14 that are not connected to the corner pattern 22a and the corner pattern 23a extend to the left side face of an active matrix substrate 1 and an opposing substrate 2, and thereby a liquid crystal injection port 24 is formed.

In the liquid crystal display panel L configured as described above, a specified amount of liquid crystal material is completely sealed in the liquid crystal layer-region 9 formed by the active matrix substrate 1, the opposing substrate 2, the liquid crystal-sealing seal pattern 7, and the liquid crystal sealing agent 25.

Next, the advantageous effects of the present embodiment are discussed. Generally, the liquid crystal-sealing seal pattern 7 is formed in the following manner. On the stacking surface of either one of the active matrix substrate 1 or the opposing substrate 2 that is outside of a display region 8, a liquid crystal-sealing seal agent (not shown) having adhesiveness is applied with a screen printing machine so as to have a uniform pattern width. Thereafter, the active matrix substrate 1 and the opposing substrate 2 are bonded together so that their respective stacking surfaces oppose each other, and further, are heat-pressed in an atmospheric pressure environment by means of high-temperature press at about 160° C. for about 3 hours.

Meanwhile, there may be cases in which the following phenomenon occurs; when the liquid crystal-sealing seal agent is applied with a screen printing machine, particularly when the dripping amount of the liquid crystal-sealing seal agent onto the screen printing plate placed in the screen printing machine is reduced to near the lower limit of the permissible value, the corner patterns in the corner regions A and the corner regions B of the liquid crystal-sealing seal pattern 7 become considerably smaller in width than the pattern width of the transversal patterns 11–14 and the longitudinal patterns 15–17. In this case, in order to completely seal the liquid crystal material (not shown) in the liquid crystal layer-region 9, it is necessary that the corner patterns in the corner regions A and the corner regions B of the liquid crystal-sealing seal pattern 7 have no disconnection, or that they have no passages, such as pinholes, through which the liquid crystal material flows out even if there is no disconnection.

However, the commonly-used liquid crystal-sealing seal agent is an adhesive agent in which an epoxy resin and a phenolic curing agent are dissolved in an organic solvent such as ethyl cellosolve, and accordingly, in the fabrication step of forming the liquid crystal-sealing seal pattern 7, ethyl cellosolve vaporizes due to heat, forming air bubbles (not shown) inside the liquid crystal-sealing seal agent. These air bubbles are trapped inside the liquid crystal-sealing seal agent that is being cured, and the air bubbles remain inside the liquid crystal-sealing seal pattern 7. These air bubbles have such a characteristic that many of them are formed particularly in the corner patterns in the corner regions A and the corner regions B of the liquid crystal-sealing seal pattern 7. For that reason, in cases where the corner patterns in the corner regions A and the corner regions B of the liquid crystal-sealing seal pattern 7 are formed to be considerably smaller in width than the pattern width of the transversal patterns 11–14 and the longitudinal patterns 15–17 etc. and numerous air bubbles are formed inside the corner patterns in the corner regions A and the corner regions B of the liquid crystal-sealing seal pattern 7, the formed air bubbles may come near to each other and aggregate, resulting in disconnection of any of the corner patterns in the corner regions A and the corner regions B. In this case, the problem of injection defect arises, which when injecting a liquid crystal material into the liquid crystal layer-region 9, the liquid crystal material leaks from the liquid crystal layer-region 9.

Further, even if the disconnection of the corner patterns is not reached, a pinhole (not shown) piercing through to the outside of the liquid crystal layer-region 9 may be formed when air bubbles formed inside the corner patterns in the corner regions A and the corner regions B gather substantially linearly and a plurality of them connect with each other. In this case, the problem of filling defect arises, which the liquid crystal material filled in the liquid crystal layer-region 9 leaks out of the liquid crystal layer-region 9 over time.

As shown in FIGS. 1A and 1B, the corner patterns 18a–21a and 22a–23a that are formed to have a width W1 that is +10% or more wider than the pattern width W of the transversal patterns 11–14 and the longitudinal patterns 15–17 are provided in the corner regions A and the corner regions B of liquid crystal-sealing seal pattern 7. In this case, even if air bubbles remain inside each of the corner patterns during the fabrication step of forming the liquid crystal-sealing seal pattern 7, the corner patterns 18a–21aand 22a–23a are formed to be wide, and thus, it is possible to prevent the formation of pinholes inside the corner patterns 18a–21a and 22a–23a and the disconnection of the corner patterns 18a–21a and 22a–23a. As a consequence, a specified amount of liquid crystal material is completely sealed in the liquid crystal layer-region 9 formed by the active matrix substrate 1, the opposing substrate 2, the liquid crystal-sealing seal pattern 7, and the liquid crystal sealing agent 25, and it is possible to remedy deficiencies such as injection defects and filing defects with a liquid crystal material, making it possible to provide a liquid crystal display panel that is excellent in quality.

It is sufficient that the corner patterns 18a–21a and 22a–23a are formed so as to be +10% or more wider than the pattern width of the transversal patterns 11–14 and the longitudinal patterns 15–17, or more preferably, it is sufficient that they are formed to be +15% or more wider. Their shapes are not limited to a rectangle but may be any shape, and their sizes may also be any size.

Embodiment 2

Embodiment 2 of the present invention shows a second example of the configuration of the liquid crystal display panel that is capable of preventing a liquid crystal material from flowing out by forming the pattern width of the corner patterns to be wider than the pattern width of the other patterns than the corner patterns.

Figure 2A:
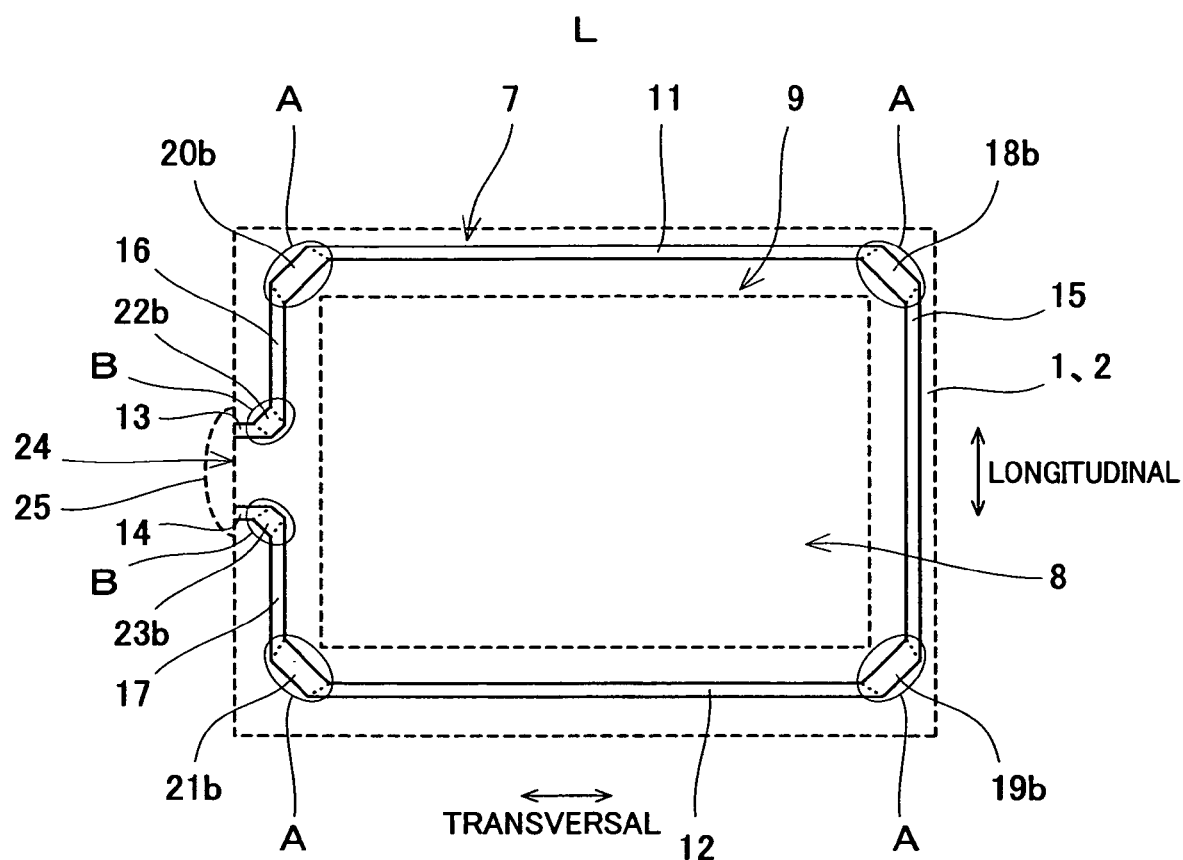
Figure 2B:
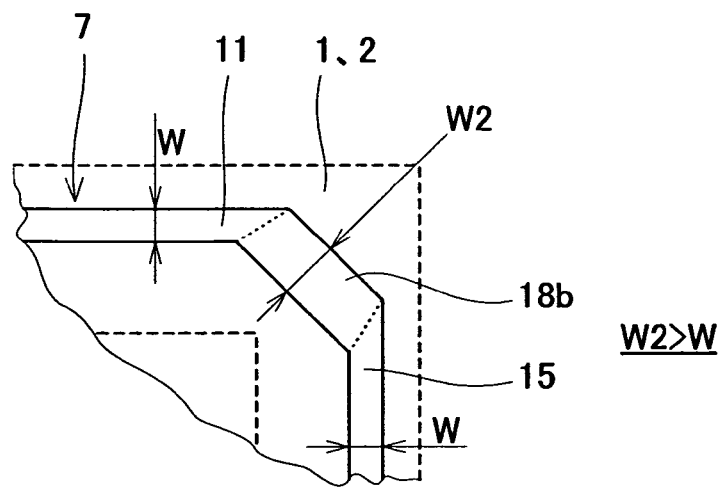

FIGS. 2A and 2B are views schematically showing the shape of a liquid crystal-sealing seal pattern according to Embodiment 2 of the present invention, wherein FIG. 2A is a plan view showing the entirety of the liquid crystal-sealing seal pattern arranged in a liquid crystal display panel and FIG. 2B is a plan view showing a corner pattern of the liquid crystal-sealing seal pattern of FIG. 2A enlarged. It should be noted that the same reference characters in FIG. 2 denote the same or corresponding parts in FIG. 7.

As shown in FIGS. 2A and 2B, in the present embodiment, a pattern width W2 of corner patterns 18b–21b and 22b–23b of the liquid crystal-sealing seal pattern 7 is formed to be +10% or more wider than the pattern width W of the transversal patterns 11–14 and the longitudinal patterns 15–17 that are connected to the corner patterns, and moreover, the corner patterns 18b–21b and 22b–23b of the liquid crystal-sealing seal pattern 7 are connected to the respective transversal patterns 11–14 and the respective longitudinal patterns 15–17 so as to form an obtuse angle. Thus, the liquid crystal-sealing seal pattern 7 is formed. The rest of the configurations are similar to those of Embodiment 1.

Such a configuration also makes it possible to attain similar advantageous effects to those in Embodiment 1.

It is sufficient that the pattern width W2 of the corner patterns 18b–21b and 22b–23b is formed so as to be wider than +10% or more wider than the pattern width W of the transversal patterns 11–14 and the longitudinal patterns 15–17, or more preferably, it is sufficient that they are formed to be +15% or more wider. Further, their shapes and sizes may be any shape and size. Furthermore, it is sufficient that the angle where the corner patterns 18b–21b and 22b–23b connect with the transversal patterns 11–14 and the longitudinal patterns 15–17 is an obtuse angle, and the angles may be any angle.

Embodiment 3

Embodiment 3 of the present invention shows a third example of the configuration of the liquid crystal display panel that is capable of preventing a liquid crystal material from flowing out by forming the pattern width of the corner patterns to be wider than the pattern width of the other patterns than the corner patterns.

Figure 3A:
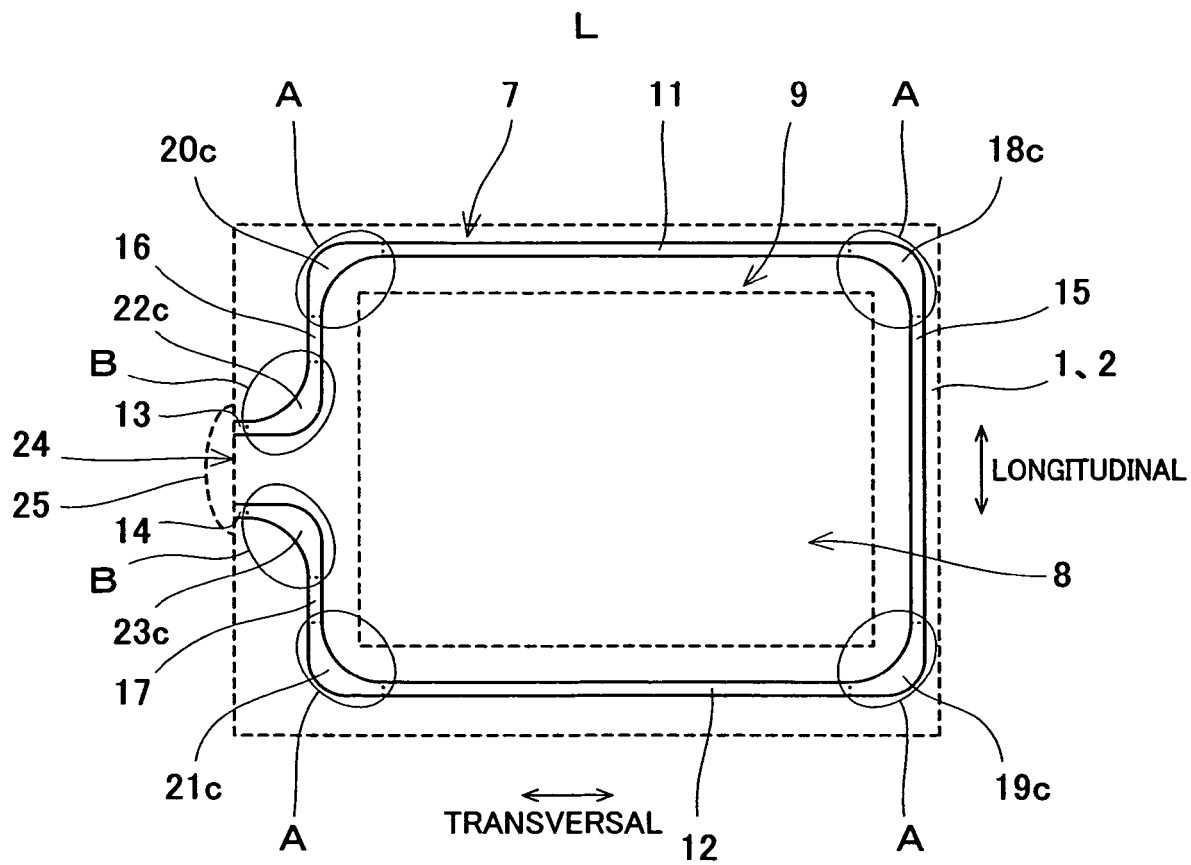
Figure 3B:
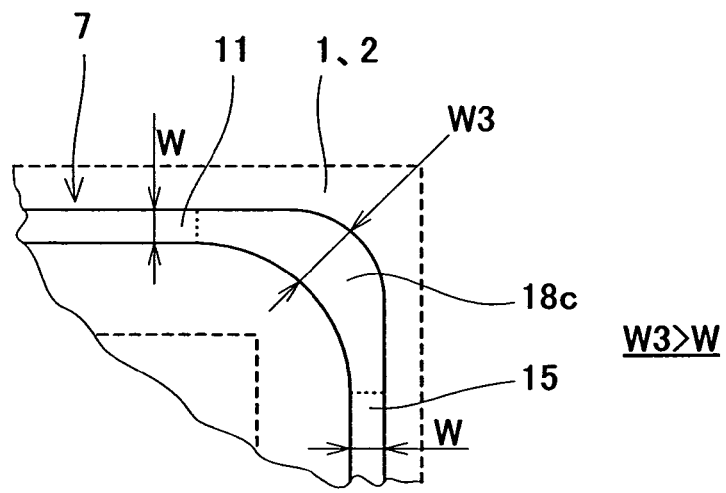

FIGS. 3A and 3B are views schematically showing the shape of a liquid crystal-sealing seal pattern according to Embodiment 3 of the present invention, wherein FIG. 3A is a plan view showing the entirety of the liquid crystal-sealing seal pattern arranged in a liquid crystal display panel and FIG. 3B is a plan view showing a corner pattern of the liquid crystal-sealing seal pattern of FIG. 3A enlarged. It should be noted that the same reference characters in FIG. 3 denote the same or corresponding parts in FIG. 7.

As shown in FIGS. 3A and 3B, in the present embodiment, corner patterns 18c–21c and 22c–23c of the liquid crystal-sealing seal pattern 7 are formed so that a pattern width W3 of their middle portion is +10% or more wider than the pattern width W of the transversal patterns 11–14 and the longitudinal patterns 15–17 that are connected to these corner patterns, and moreover, they are formed in a round shape. In addition, the corner patterns 18c–21c and 22c–23c of the liquid crystal-sealing seal pattern 7 are connected smoothly to the transversal patterns 11–14 and the longitudinal patterns 15–17 so that a tangential line to any position on the corner patterns forms an obtuse angle with the transversal patterns 11–14 and the longitudinal patterns 15–17. Thus, the liquid crystal-sealing seal pattern 7 is formed. The rest of the configurations are similar to those of Embodiment 1.

Such a configuration also makes it possible to attain similar advantageous effects to those in Embodiment 1.

It is sufficient that the pattern width W3 of the middle portion of the corner patterns 18c–21c and 22c–23c is formed to be +10% or more wider than the pattern width W of the transversal patterns 11–14 and the longitudinal patterns 15–17, or more preferably, it is sufficient that they are formed to be +15% or more wider. Further, their shapes and sizes may be any shape and size. In addition, it is sufficient that the corner patterns 18c–21c and 22c–23c are connected to the transversal patterns 11–14 and the longitudinal patterns 15–17 in such a manner that a tangential line to any position on the corner patterns forms an obtuse angle with the transversal patterns 11–14 and the longitudinal patterns 15–17.

Embodiment 4

Embodiment 4 of the present invention shows a fourth example of the configuration of the liquid crystal display panel that is capable of preventing a liquid crystal material from flowing out by forming the pattern width of the corner patterns to be wider than the pattern width of the other patterns than the corner patterns.

Figure 4A:
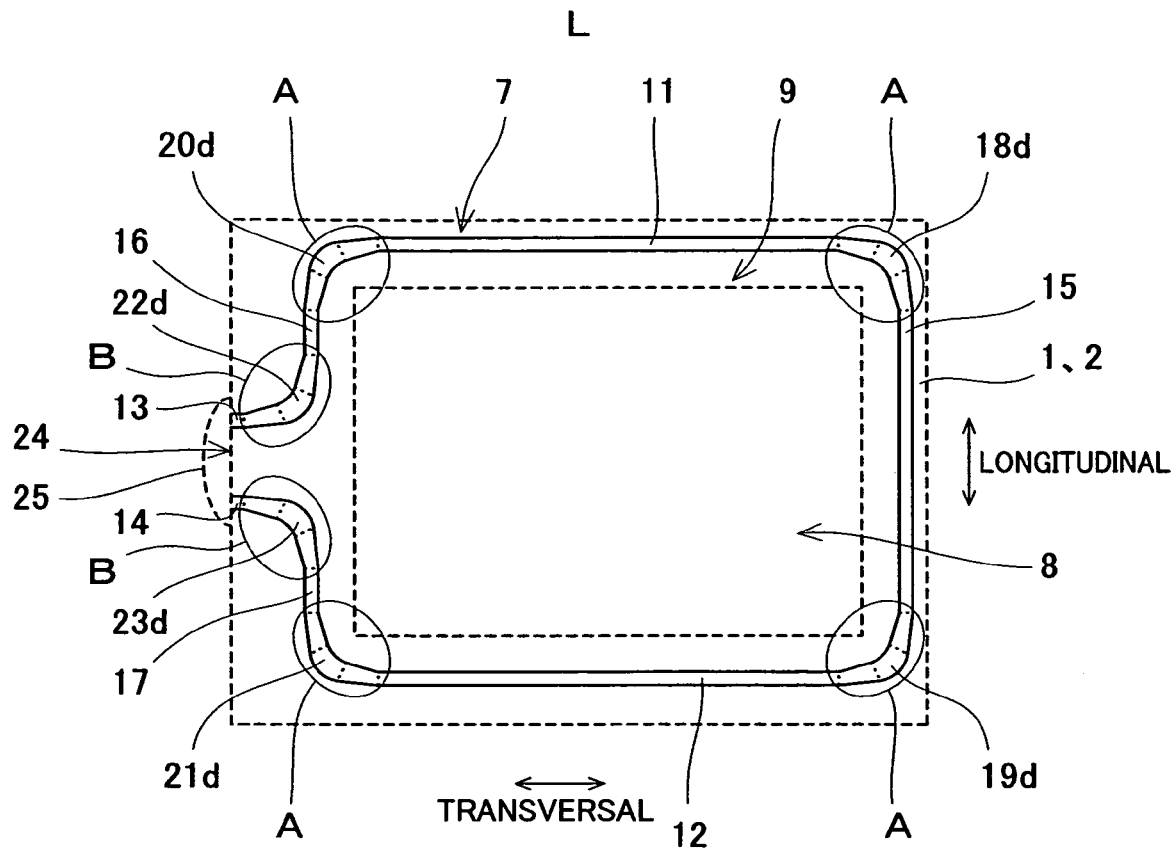
Figure 4B:
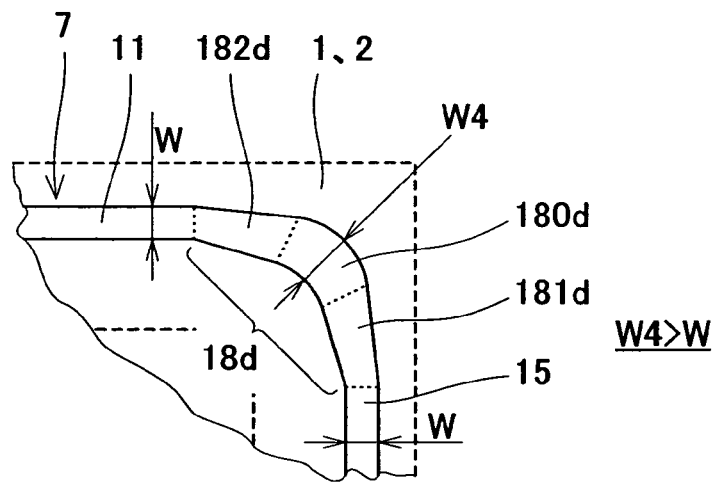

FIGS. 4A and 4B are views schematically showing the shape of a liquid crystal-sealing seal pattern according to Embodiment 4 of the present invention, wherein FIG. 4A is a plan view showing the entirety of the liquid crystal-sealing seal pattern arranged in a liquid crystal display panel and FIG. 4B is a plan view showing a corner pattern of the liquid crystal-sealing seal pattern of FIG. 4A enlarged. It should be noted that the same reference characters in FIG. 4 denote the same or corresponding parts in FIG. 7.

Figure 5A:
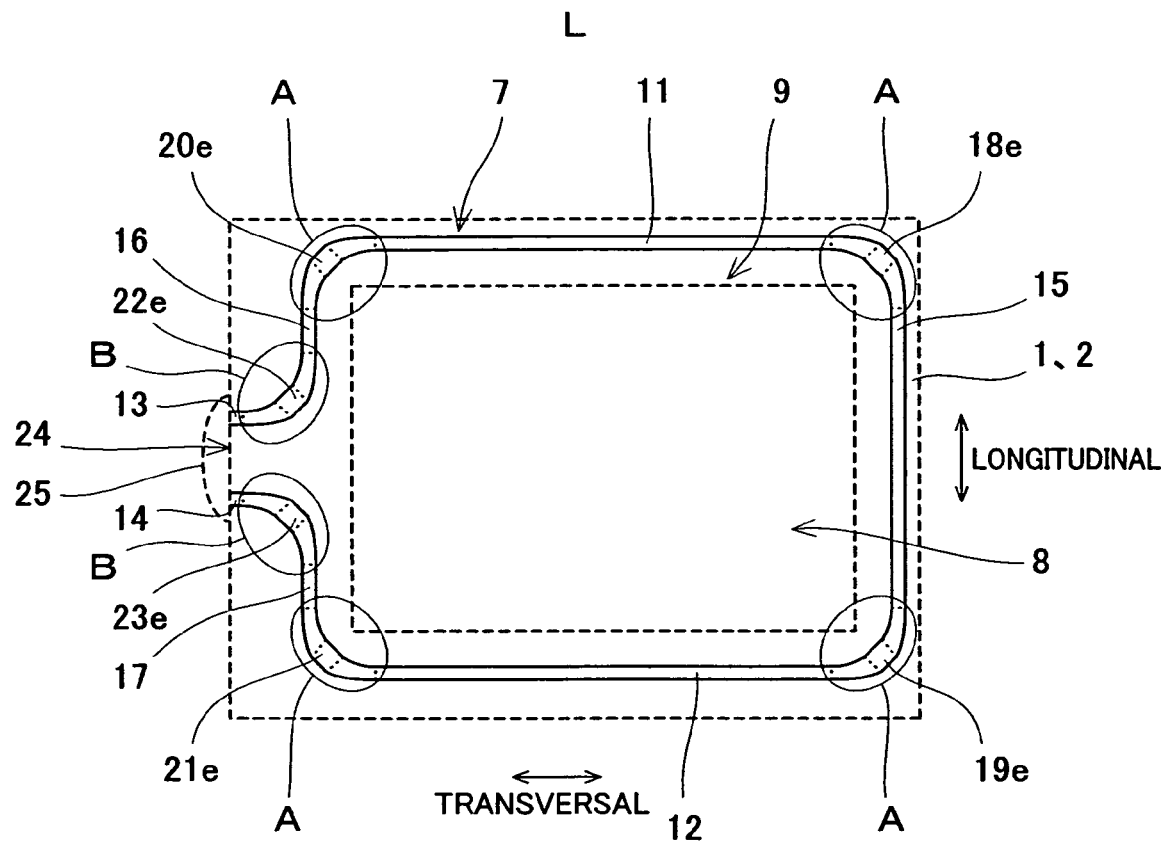
Figure 5B:
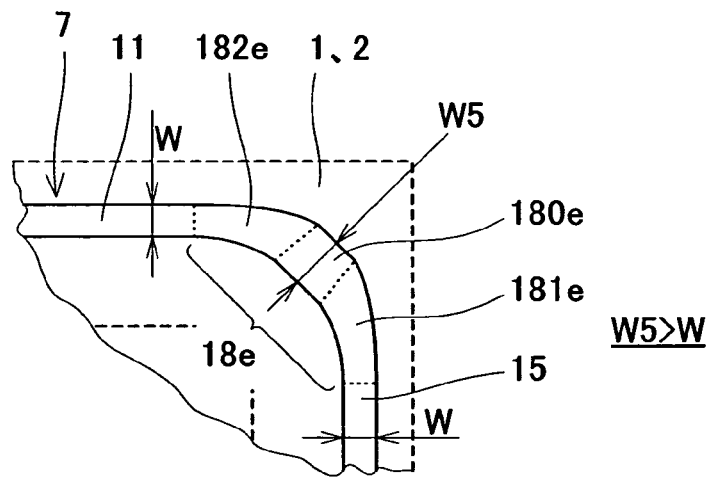
Figure 6:
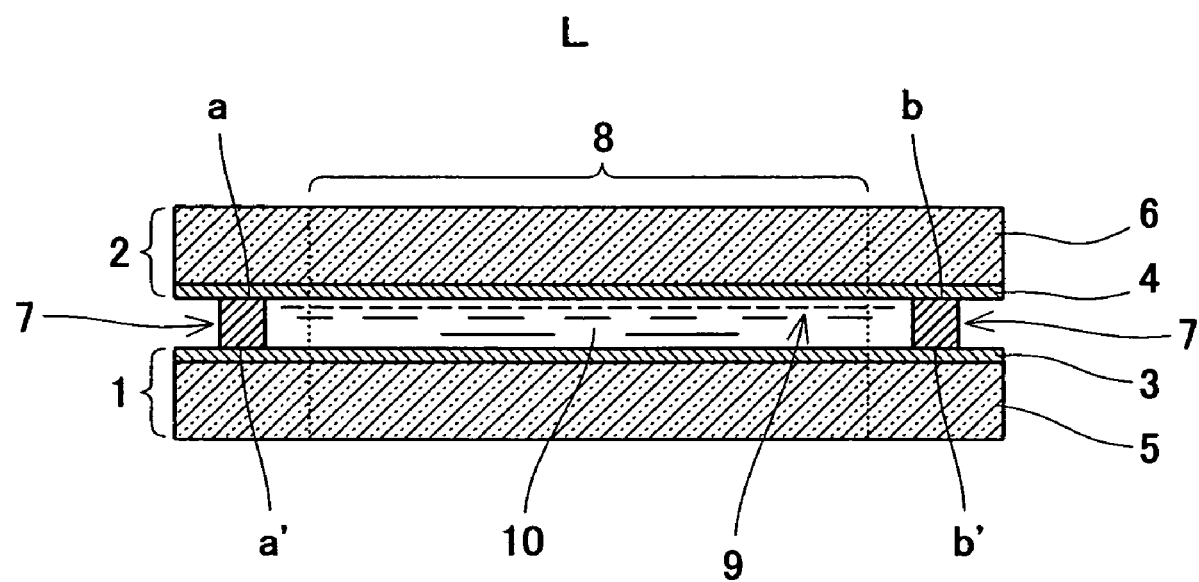
FIG. 6 is a cross-sectional view schematically showing a cross-sectional structure of a conventional active matrix-type liquid crystal display panel.

Likewise, FIGS. 5A and 5B are views schematically showing the shape of another liquid crystal-sealing seal pattern according to Embodiment 4 of the present invention, wherein FIG. 5A is a plan view showing the entirety of the liquid crystal-sealing seal pattern arranged in a liquid crystal display panel and FIG. 5B is a plan view showing a corner pattern of the liquid crystal-sealing seal pattern of FIG. 5A enlarged. It should be noted that the same reference characters in FIG. 5 denote the same or corresponding parts in FIG. 7.

As shown in FIGS. 4A and 4B, or in FIGS. 5A and 5B, in the present embodiment, corner patterns 18d–21d and 22d–23d, or corner patterns 18e–21e and 22e–23e, of the liquid crystal-sealing seal pattern 7 are formed so that a pattern width W4 or W5 of their middle portion is +10% or more wider than the pattern width W of the transversal patterns 11–14 and the longitudinal patterns 15–17 that are connected to the corner patterns, and moreover, a round-shaped pattern 180d is formed in combination with linear-shaped patterns 181d and 182d, or round-shaped patterns 181e and 182e are formed in combination with a linear-shaped pattern 180e. In addition, the corner patterns 18d–21d and 22d–23d, or the corner patterns 18e–21e and 22e–23e, of the liquid crystal-sealing seal pattern 7 are connected smoothly to the transversal patterns 11–14 and the longitudinal patterns 15–17 in such a manner that a tangential line to any position on the corner patterns forms an obtuse angle with the transversal patterns 11–14 and the longitudinal patterns 15–17. Thus, the liquid crystal-sealing seal pattern 7 is formed. The rest of the configurations are similar to those of Embodiment 1.

Such a configuration also makes it possible to attain similar advantageous effects to those in Embodiment 1.

It is sufficient that the pattern width W4 or W5 of the middle portion of the corner patterns 18d–21d and 22d–23d, or of the corner patterns 18e–21e and 22e–23e, is formed to be +10% or more wider than the pattern width W of the transversal patterns 11–14 and the longitudinal patterns 15–17, or more preferably, it is sufficient that they are formed to be +15% or more wider. Their shapes and sizes may be any shape and size. Furthermore, it is sufficient that the corner patterns 18d–21d and 22d–23d, or the corner patterns 18e–21e and 22e–23e, are connected to the transversal patterns 11–14 and the longitudinal patterns 15–17 in such a manner that a tangential line to any position on the corner patterns forms an obtuse angle with the transversal patterns 11–14 and the longitudinal patterns 15–17.

In the foregoing Embodiments 1 to 4, a liquid crystal display panel is taken as an example of an image display element, but other image display elements may be employed. In addition, an active matrix type liquid crystal display panel is taken as an example of the liquid crystal display panel, but it may be a super twisted-nematic type.

From the foregoing description, numerous improvements and other embodiments of the present invention will be readily apparent to those skilled in the art. Accordingly, the foregoing description is to be construed only as examples, and as being presented for the purpose of suggesting the best mode for carrying out the invention to those skilled in the art. Modifications may be made in structures and/or functions substantially without departing from the sprit of the invention.

INDUSTRIAL APPLICABILITY

The liquid crystal display panel according to the present invention is useful as a liquid crystal display panel for consumer-use and industrial-use information devices such as notebook-type personal computers and word processors, and for video devices such as portable televisions, camcorders, and vehicle navigation systems.

The invention claimed is:

1. A liquid crystal display panel wherein a pair of substrates are bonded with each other at a predetermined gap by a liquid crystal-sealing seal pattern interposed therebetween, the liquid crystal-sealing seal pattern having a corner pattern and being arranged so as to surround a display region when viewed in plan, and a liquid crystal is sealed in a region surrounded by the liquid crystal-sealing seal pattern, characterized in that:
the corner pattern of the liquid crystal-sealing seal pattern has a portion substantially wider than another pattern connected to the corner pattern.

2. The liquid crystal display panel according to claim 1, wherein the corner pattern of the liquid crystal-sealing seal pattern is connected to the other pattern so as to form an obtuse angle.

3. The liquid crystal display panel according to claim 1, wherein the corner pattern of the liquid crystal-sealing seal pattern is formed by a round-shaped pattern.

4. The liquid crystal display panel according to claim 1, wherein the corner pattern of the liquid crystal-sealing seal pattern is formed by a combination of a round-shaped pattern and a linear-shaped pattern.

5. The liquid crystal display panel according to china 1, wherein the portion substantially wider than another pattern connected to the corner pattern is +10% or more wider than another pattern connected to the corner pattern.

6. The liquid crystal display panel according to claim 1, wherein the portion substantially wider than another pattern connected to the corner pattern is +15% or more wider than another pattern connected to the corner pattern.

* * * * *